United States Patent [19]

Hall et al.

[11] Patent Number: 5,317,057

[45] Date of Patent: May 31, 1994

[54] (HALOMETHYL VINYL ARENE)-MODIFIED ELASTOMERS AND COMPOSITIONS CONTAINING THEM HAVING REDUCED HYSTERESIS PROPERTIES

[75] Inventors: James E. Hall, Mogadore; William L. Hergenrother, Akron; James Oziomek, Cuyahoga Falls, all of Ohio

[73] Assignee: Bridgestone Corporation, Tokyo, Japan

[21] Appl. No.: 998,204

[22] Filed: Dec. 30, 1992

[51] Int. Cl.$^5$ .................... C08L 9/06; C08L 9/00; C08L 11/00

[52] U.S. Cl. ..................... 524/575; 524/571; 524/572; 524/573; 524/574; 524/576; 524/577; 524/578; 524/579; 525/292; 525/331.9; 525/332.3; 525/332.4; 525/337.5; 526/173; 526/183

[58] Field of Search ............. 524/575, 572, 573; 525/292, 331.9

[56] References Cited

U.S. PATENT DOCUMENTS

| | | | |
|---|---|---|---|
| 3,109,871 | 11/1963 | Zalinski et al. | 260/5.1 |
| 3,177,190 | 4/1965 | Hsieh | 260/94.2 |
| 3,178,398 | 4/1965 | Strobel | 260/85.1 |
| 3,317,918 | 5/1967 | Foster | 260/83.7 |
| 3,393,182 | 7/1968 | Trepka | 260/79.5 |
| 3,426,006 | 2/1969 | Nützel et al. | 260/83.5 |
| 3,439,049 | 4/1969 | Trepka | 260/624 |
| 3,786,116 | 1/1974 | Milkovich | 525/276 |
| 3,842,059 | 10/1974 | Milkovich | 525/292 |
| 3,842,146 | 10/1975 | Milkovich | 525/314 |
| 3,856,877 | 12/1974 | Otsuki et al. | 260/677 |
| 3,862,077 | 1/1975 | Schulz | 525/129 |
| 4,015,061 | 3/1977 | Schultz et al. | 526/178 |
| 4,026,865 | 5/1977 | Uraneck et al. | 260/42.32 |
| 4,038,245 | 7/1977 | Reineke | 260/45.7 |
| 4,048,425 | 9/1977 | Kuntz | 526/245 |
| 4,085,265 | 4/1978 | Otsuki et al. | 526/49 |
| 4,247,418 | 1/1981 | Halasa et al. | 252/431 |
| 4,262,041 | 4/1981 | Eguchi et al. | 427/245 |
| 4,316,001 | 2/1982 | Boileau et al. | 528/14 |
| 4,383,085 | 5/1983 | Fujimaki et al. | |
| 4,414,372 | 11/1983 | Farnham et al. | 526/190 |
| 4,424,091 | 1/1984 | Hall | 526/181 |
| 4,476,240 | 10/1984 | Hall et al. | 502/155 |
| 4,478,953 | 10/1984 | Yuki et al. | 502/155 |

(List continued on next page.)

FOREIGN PATENT DOCUMENTS

| | | |
|---|---|---|
| 0067111 | 12/1982 | European Pat. Off. . |
| 0270565 | 1/1987 | European Pat. Off. . |
| 0264506 | 4/1988 | European Pat. Off. . |
| 0282437 | 9/1988 | European Pat. Off. . |
| 0290883 | 11/1988 | European Pat. Off. . |
| 0316255 | 5/1989 | European Pat. Off. . |
| 138070 | 10/1979 | Fed. Rep. of Germany . |
| 247455 | 8/1987 | Fed. Rep. of Germany . |
| 54-65788 | 5/1979 | Japan . |
| 2117778 | 10/1983 | United Kingdom . |

OTHER PUBLICATIONS

"Anionic Polymerization Initiated by Diethylamide in Organic Solvents" by Angood et al., Journal of Polymer Science, vol. 11, p. 2777 (1973).

(List continued on next page.)

*Primary Examiner*—Fred Zitomer
*Attorney, Agent, or Firm*—Daniel N. Hall

[57] ABSTRACT

A (halomethyl arene)-modified elastomer is made by reacting a lithium terminated elastomer intermediate with the halogen atoms of a halomethyl vinyl arene compound. A road-contacting tread component for a pneumatic tire is fabricated from vulcanized elastomer made by vulcanizing an elastomer composition of a (halomethyl arene)-modified elastomer, a carbon black reinforcing agent, and a sulfur-based vulcanizing system. A process for making a (halomethyl arene)-modified elastomer includes polymerizing at least one diene monomer with a lithium-containing initiator, capping the lithium terminated elastomer by reaction with a halomethyl arene compound, and recovering the modified elastomer.

18 Claims, No Drawings

U.S. PATENT DOCUMENTS

| | | | |
|---|---|---|---|
| 4,515,922 | 5/1985 | Sakakibara et al. | 525/99 |
| 4,581,428 | 4/1986 | Farnham | 526/190 |
| 4,587,203 | 5/1986 | Brault et al. | 430/325 |
| 4,614,771 | 9/1986 | Watanabe et al. | 525/351 |
| 4,616,069 | 10/1986 | Watanabe et al. | 525/370 |
| 4,659,776 | 4/1987 | Russell | 525/95 |
| 4,677,153 | 1/1987 | Kitahara et al. | 524/552 |
| 4,711,942 | 12/1987 | Webster | 526/185 |
| 4,734,461 | 3/1988 | Roggero et al. | 525/296 |
| 4,735,994 | 4/1988 | Roggero et al. | 525/279 |
| 4,736,003 | 4/1988 | Schneider et al. | 526/190 |
| 4,791,174 | 12/1988 | Bronstert et al. | 525/274 |
| 4,816,520 | 3/1989 | Bronstert | 525/285 |
| 4,835,209 | 5/1989 | Kitagawa et al. | 524/507 |
| 4,894,409 | 1/1990 | Shimada et al. | 524/492 |
| 4,914,147 | 4/1990 | Mouri | 524/495 |

OTHER PUBLICATIONS

"Bifunctional Anionic Initiators: A Critical Study and Overview" Makromol. Chem 186, pp. 2017-2024 (1985), by Bandermann et al.

"A Bifunctional Anionic Initiator Soluble in Non-Polar Solvents" Makromol. Chem. 179, (1978), pp. 551-555, by Beinert et al.

"Some Reactions of Tributyl- and Triphenyl-stannyl Derivatives of Alkali Metals" by Blake et al., J. Chem. Soc., 1961, 618-622.

"Specific Functionalization of Polymers of Carboxyl Groups" Makromol, Chem, 179, (1978), pp. 1383-1386, by Broze et al.

"Anionic Polymerization" by Cheng, American Chemical Society Symposium Seriex 166, pp. 513-528, (1981) by Cheng.

*Chemical Abstracts*, vol. 91, No. 12, Sep. 1979, Chiba et al.

"3-Dimethylaminopropyl-Lithium-An Analytical and Kinetic Investigation of a New Initiator System for Polymer Synthesis" European Polymer Journal, vol. 11, 1975, pp. 699-704 by Elisenbach et al.

"Preparation of Some Trialkyltin-Lithium Compounds" by Gillman et al., J. Am. Chem. Soc., 75, 2507-2508 (1953).

"New Perfectly Difunctional Organolithium Initiators for Block Copolymer Synthesis: Synthesis of Dilithium Initiators in the Absence of Polar Additives" Polymer, vol. 22, Dec., 1981, p. 1724, by Guyot et al.

"An Improved Synthesis of p-Dimethylaminophenyl-Lithium" by G. Hallas and D. R. Waring, May 10, 1969 *Chemistry and Industry*, p. 620.

"Studies of the Anionic Polymerization of Phenyl Vinyl Sulfoxide and Its Copolymer with Styrene" by Kanga et al. *Macromolecules*, 1990, 23, 4235-4240.

"Thermal Elimination of Poly(phynyl vinyl sulfoxide) and Its Polystyrene Block Copolymers" by Kanga et al., *Macromolecules*, 1990, 23, 4241-4246.

"Preparation and Reactions of Trialkyltinlithium" by Tamborski et al., J. Org. Chem., 28, 237 (1963).

"Polymerization of Unsaturated Compounds in the Presence of Lithium Diethylamide", Vinogradov et al., *Polymer Science USSR*, vol. 4, 1963.

"Copolymerication of Butadiene and Styrene by Initiation with Alkyllithium and Alkali Metal *tert*-Butoxides" *Journal of Polymer Science: Part A*-1, vol. 7, pp. 461-469 (1969) by Wofford.

(HALOMETHYL VINYL ARENE)-MODIFIED ELASTOMERS AND COMPOSITIONS CONTAINING THEM HAVING REDUCED HYSTERESIS PROPERTIES

TECHNICAL FIELD

The subject invention relates to elastomers, vulcanizable compositions made from them and manufactured components made from these compositions. More specifically, the present invention relates to elastomers modified by reaction with halomethyl arenes, such as halomethyl vinyl arenes, compounded compositions containing such modified elastomers and reinforcing agents and components such as treads for tires made from such compositions.

Vulcanizates made from the (halomethyl vinyl arene)-modified elastomers of the present invention have low hysteresis characteristics. Because of these reduced hysteresis properties, articles such as tires, power belts, vibration isolators and the like fabricated from components containing these vulcanizates exhibit increased rebound, decreased rolling resistance and lowered heat build-up when subjected to mechanical stresses. In addition these (halomethyl vinyl arene)-modified elastomers posses reactive functionality that makes them useful as intermediates to higher molecular weight elastomers.

BACKGROUND ART

It is known that it is desirable to produce elastomeric polymers capable of exhibiting reduced hysteresis when properly compounded with other ingredients such as reinforcing agents and then vulcanized. Such elastomers, when fabricated into components for constructing articles such as tires, vibration isolators, power belts, and the like, will manifest properties of increased rebound, decreased rolling resistance and less heat-build up when subjected to mechanical stress during normal use.

The hysteresis of an elastomer refers to the difference between the energy applied to deform an article made from the elastomer and the energy released as the elastomer returns to its initial, undeformed state. In pneumatic tires, lowered hysteresis properties are associated with reduced rolling resistance and heat build-up during operation of the tire. These properties, in turn, result in lowered fuel consumption of vehicles using such tires and prolonged tire life. In such contexts, the property of lowered hysteresis of compounded, vulcanizable elastomer compositions is particularly significant. Examples of such compounded elastomer systems are known to the art and are comprised of at least one elastomer (that is, a natural or synthetic polymer exhibiting elastomeric properties, such as a rubber), a reinforcing filler agent (such as finely divided carbon black, thermal black, or mineral fillers such as clay and the like) and a vulcanizing system such as sulfur-containing vulcanizing (that is, curing) system.

Various synthetic strategies have been developed to provide elastomers with molecular structures exhibiting reduced hysteresis energy losses. One technique is to produce elastomers of very high molecular weight. In such high molecular weight systems, the number of free uncrosslinked molecular chain-ends per given weight in the vulcanizates made from them are reduced. Since the presence of free, unbound chain ends are believed to be a significant factor in hysteretic energy loss because they cannot participate in elastic recovery processes, their reduction leads to a desirable reduction in hysteretic energy loss.

Another technique is to prepare elastomer molecules with end groups capable of interacting with the reinforcing fillers such as carbon black present in compounded elastomer compositions. Again, such interaction reduces the number of free end groups believed to contribute to hysteretic losses. Such interactive end groups include those derived from various metal reagents as well as those derived from polar organic reagents such amines, amides, esters, imines, imidies, ketones and various combinations of such groups. Heretofore, it has not been known to produce modified elastomers with purely hydrocarbyl terminal functionality which is capable of conferring low hysteresis properties. For example, commonly assigned U.S. patent application Ser. No. 07/636,961 describes elastomers with tin containing end-groups derived by initiating polymerization under anionic conditions with tin-lithium compounds such as trialkyl tin (IV) lithium, that is, (alkyl)$_3$SnLi groups. This application does not disclose or suggest reaction of polymer with modifiers that produce non-polar (that is, non-hetro atom-containing) end groups. Thus the elastomer-modifying reactions occurring in the present invention are inherently different than those described in the above-noted reference.

Another approach to elastomers with reduced hysteresis properties of elastomer compounds involves "jumping" of elastomer intermediates having terminal functionality that is reactive under anionic polymerization conditions. Such jumping reactions join two elastomer molecules to produce a single molecule of much higher molecule weight. In the present invention the modified elastomers contain vinyl arene functionality which can readily participate in jumping reactions. This functionality can also participate in intermolecular network formation during the vulcanization process. Such participation again reduces the number of free, unbound chain ends in the vulcanizate which results in low hysteretic energy loss.

The present invention is directed to (halomethyl vinyl arene)-modified elastomers which, when compounded and vulcanized by known rubber processing techniques, provide vulcanized elastomers which exhibit desirable low hysteresis characteristics. These (halomethyl vinyl arene)-modified elastomers can be made by reacting lithium-terminated elastomer intermediates with more than about 0.8 equivalents of at least one (halomethyl vinyl) arene. The modified elastomers thereby produced contain vinyl arene functionality which can either interact with vulcanizate fillers such as carbon black, participate in covulcanization network formation or serve as sites for molecular weight-increasing reactions. Mixtures of (halomethyl vinyl arene)-modified elastomers with unmodified elastomers derived from the lithium-terminated elastomer intermediates are also useful as are jumped and covulcanizate compositions made from them.

DISCLOSURE OF THE INVENTION

It is therefore an object of the present invention to provide a (halomethyl vinyl arene)-modified elastomers.

It is a further object of the present invention to provide compounded, vulcanizable elastomer compositions made from such (halomethyl vinyl arene)-modified elastomers.

It is yet another object of the present invention to provide a vulcanized elastomeric compositions having reduced hysteresis characteristics.

It is still a further object of the present invention to provide elastomeric compounds for use in manufacturing articles and components for articles which exhibit low hysteresis properties.

Still another object of the present invention is to provide improved tires having decreased rolling resistance and low heat build-up characteristics.

Yet another object of the present invention is to provide modified elastomers with non-polar terminal functionality capable of participating in covulcanization network-forming reactions and molecular weight increasing jumping reactions.

These and other objects together with the advantages thereof over the existing art, which shall become apparent from the specification which follows, are accomplished by the invention as hereinafter described and claimed.

SUMMARY OF THE INVENTION

The present invention provides (halomethyl vinyl arene)-modified elastomers made by capping lithium-terminated elastomer intermediates with one or more halomethyl vinyl arenes of the formula $$X\ CH_2ArCR=CH_2 \tag{I}$$

wherein R is hydrogen or lower alkyl group of one to about eight carbons or an aryl group of six to about ten carbons, Ar is a divalent aryl nucleus of 6 to about 12 carbon atoms and X is a halogen atom.

Typically the lithium-terminated intermediate is a diene polymer made by polymerizing a conjugated diene monomer of four to about eight carbons with a lithium initiator; often it is made by copolymerizing the diene monomer with a vinyl arene monomer of eight to about twelve carbons to produce a diene-vinyl arene copolymer of the general formula poly (butadiene-co-vinyl arene). Such copolymers are usually random in structure. Specific diene monomers include butadiene and its homologs and specific vinyl arenes include styrene and its homologs, but generally do not include halomethyl vinyl arene such as those used in the modifying reaction and described above in Formula I. Thus the vinyl arenes used in producing the elastomer intermediate are non-halo methyl vinyl arenes.

Also within the scope of the invention are compounded, vulcanizable elastomer compositions comprising (a) the (halomethyl vinyl arene)-modified elastomer described above, (b) a finely divided reinforcing agent such as carbon black and (c) a vulcanizing system such as a sulfur-based vulcanizing system.

A further aspect of the invention provides a vulcanized elastomer compound of low hysteresis properties made by vulcanizing the above described elastomer compositions. The invention also included components for fabricated rubber articles such as pneumatic tires made from these vulcanized compounds and specifically road-contacting tread components for use in the construction of such tires. Tires of low rolling resistance comprising these road-contacting tread components are also within the scope of the invention.

The invention also comprises processes for making (halomethyl vinyl arene)-modified elastomers which comprise the steps of:

(I) polymerizing under anionic conditions with a lithium-containing initiator at least one conjugated diene monomer and, optionally at least one vinyl arene monomer, to form a lithium-terminated elastomer intermediate;

(II) reacting the lithium terminated elastomer intermediate under anionic reaction conditions with at least one halomethyl vinyl arene of the above general formula (I), the amount of halomethyl vinyl arene being about 0.8 to about 1.5 molar equivalents based on lithium in the lithium-terminated elastomer intermediate, to form a (halomethyl vinyl arene)-modified elastomer intermediate;

(III) recovering the (halomethyl vinyl arene)-modified elastomer.

Other aspects of the invention will be apparent to those of skill in the art upon study of this specification.

DETAILED DESCRIPTION OF THE INVENTION

The (halo methyl vinyl arene) modified elastomers of the present invention are made by reaction of a lithium-terminated elastomer intermediate with about 0.8 to about 1.5 molar equivalents (based on the lithium) of a halo methyl vinyl arene of the formula $$X\ CH_2ArCR=CH_2 \tag{I}$$

wherein R is a hydrogen atom, a lower alkyl group of one to about eight carbons, such as a methyl, ethyl, propyl, butyl and so forth to octyl group, or an aryl group of six to ten carbons such as phenyl, tolyl, xylyl, naphthyl and the like. Preferably, R is a hydrogen atom or a methyl, ethyl or phenyl group. In the above halo methyl vinyl arene formula, Ar is preferably a divalent aryl nucleus group (that is, an aryl nucleus having two valences which are satisfied by the halomethyl and vinyl substituents of six to twelve carbons such as a phenyl, methyl, ethyl, butyl, decyl, dodecyl, or an aryl, alkaryl or aralkyl group such as, phenylene, ethylphenylene, tolylene, xylylene, and naphthalene nucleus. Structurally, these divalent aryl nuclei can be represented by formula such as

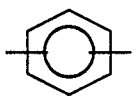 (IIa)

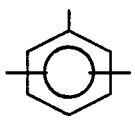 (IIb)

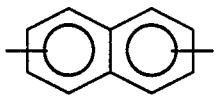 (IIc)

Preferably, Ar is a phenylene nucleus (that is Formula IIa). A halogen atom can be a fluorine, chlorine, bromine or iodine atom; typically, it is a chlorine or bromine atom, preferably, a chlorine atom. A particularly useful class of halo methyl vinyl arenes are those which are hydrocarbon soluble, that is, those having a solubility at 24° of at least about 10 grams per 100 ml. of n-octane. Mixtures of two or more of the above-described halomethyl vinyl arenes can also be used. Examples of useful halomethyl arenes are (halomethyl)—Ph—CH=CH$_2$, where Ph is a —C$_6$H$_4$ or —C$_6$H$_3$(CH$_3$)—nucleus. A specifically useful halomethyl vinyl arene is chloromethyl styrene.

The halomethyl vinyl arenes used in making the modified elastomers of the present invention are known in the art. They can be made, for example, by halo methylation reactions on aryl substrates having protected vinyl groups or from simple halo methyl arene by vinylation or halo substitution reaction. Chloromethyl styrenes are well known and have been the subject of a number of publications and patents; see U.S. Pat. No. 4,967,026 to Darem.

Substituted styrene modifying agents having both halo and alkyl substituents are prepared from halotoluene, haloxyxlene and other halo and alkyl benzenes. Illustrative styrene modifying agents include chloromethyl styrene, bromo methyl styrene, chloromethylmethyl styrene, chloromethyl dimethyl styrene and the like. See U.S. Pat. No. 4,587,203. Chloromethyl vinyl naphthalene is also known; see U.S. Pat. No. 4,262,041. Mixtures of halomethyl vinyl arenes within the scope of Formula I can also be used in the invention.

The lithium-terminated elastomer intermediates of the present invention are prepared by anionic polymerization of diene monomers with a lithium-containing polymerization initiator. Useful diene monomers are conjugated alkadienes of four to about eight carbon atoms such as butadiene, isoprene, pentadiene, 2,3-dimethyl butadiene, etc. Among these, 1,3-butadiene is preferred. Mixtures of such diene monomers can be useful.

While the diene monomer can be homopolymerized to provide a poly (butadiene) lithium terminated elastomer intermediate for use in this invention, it is usually preferable that it be copolymerized with a vinyl arene monomer of eight to about twelve carbons such as styrene, vinyl toluene, p-methyl styrene, alphamethyl styrene, vinyl naphthalene and the like. Mixtures of dienes and/or vinyl arenes can also be used to make the lithium terminated elastomer intermediates used in this invention. Preferably styrene is the comonomer of choice and lithium-terminated butadiene-styrene elastomer intermediates are the result.

The above-described diene and optional vinyl arene monomers are polymerized under anionic conditions with a lithium-containing polymerization initiator to provide the lithium-terminated elastomer intermediates of this invention. Techniques, parameters, conditions and initiators for such anionic polymerizations are known to those skilled in the art. Such polymerizations provide "living" polymers, that is, polymers with a reactive lithium site on the polymer molecules. Preferred monolithium initiators include alkyl and aryl lithiums such as n-butyl lithium, t-butyl and s-butyl lithium, and phenyl lithium, as well as tri(alkyl) tin lithiums such as tributyl tin lithium. When the latter type of initiator is employed, the resulting elastomer intermediate molecules carry a tri(alkyl) tin group as well as the lithium site.

By "modified" as used herein, for example when referring to the "modified elastomers" according to the invention, and by similar words, it is understood to mean that the elastomer chains are predominately end-capped, although it is understood that there may be some chain coupling, cross-linking and the like. However, such branching of chains, while increasing molecular weight, also increases viscosity and decreases processibility. Therefore, while mixtures of branched and end-capped polymer chains are within the scope of the invention, it is preferred that the halogen constituent react with the lithium on the growing polymer chain, breaking the carbon-lithium bond and producing an end-capped polymer.

Polymerization is usually conducted in a conventional solvent for anionic polymerizations such as essentially moisture-free hydrocarbons such as hexane, cyclohexane, benzene and the like. Techniques for polymerization, such as semi-batch and continuous polymerization may be employed. If it is desired, to promote randomization in copolymerization and to control vinyl content, a polar coordinator may be included with the polymerization ingredients. The amount of coordinator depends on the amount of vinyl content desired, the level of styrene employed and the temperature of polymerization, as well as the nature of the specific polar coordinator (modifier) employed.

Compounds useful as polar coordinators include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA), N-N'-dimethylpiperazine, and tributylamine; tetrahydrofuran (THF), linear and cyclic oligomeric oxolanyl alkanes such as 2-2'-di(tetrahydrofuryl) propane, di-piperidyl ethane, hexamethylphosphoramide, diazabicyclooctane, dimethyl ether, diethyl ether, and the like.

A batch polymerization is begun by charging a blend of monomer(s) and solvent to a suitable reaction vessel, followed by the addition of the polar coordinator (if employed) and the initiator compound previously described. The reactants are heated to a temperature of from about 0° to about 200° and the polymerization is allowed to proceed for from about 0.1 to about 24 hours.

It is usually desired to produce a reactive copolymer intermediate of butadiene and styrene having elastomeric properties for use in the present invention. Such polymers are well-known to the art as styrene/butadiene rubbers, that is, SBR. With such SBRs the lithium-terminated elastomer intermediate used in the present invention can be represented as poly (butadiene-co-styrene)-Li. Such SBRs usually have a diene to styrene content of 90-50:10-50, typically 80-60:20-40 and number average molecular weights, M$_n$, (as determined by gel permeation chromatography) of about 10,000 to 1,000,000 or greater, preferably about 50,000 to 750,000, typically about 125,000 to 500,000.

The modification of the lithium-terminated elastomer intermediates with the holomethyl vinyl arene takes place by reaction under anionic conditions essentially the same as used in the polymerization of the diene. Often the modifying agent is simply added to the initial polymerization reaction mixture and reaction continued until the desired amount is reacted. Usually this reaction is conducted at a temperature between 0°-90°, typically 15°-30° for about 0.5 to 6.0 hours or more. Often the modifying reaction is carried out at ambient temperature of 15°-30° for a convenient period of time such as about 1.0-4.0 hours. Lithium halide is generally produced as a by-product of the modification reaction.

The (halomethyl vinyl arene)-modified elastomer is recovered by standard techniques such as isolating the polymer from solvent and reacting by-products by conventional means such a precipitation, steam coagulation, thermal desolventation and the like. The modified elastomer can be further dried by drum, extruder, or vacuum drying or a combination of such procedures. Filtration, water washing and similar techniques are used to remove lithium halide by-products when desired.

The (halomethyl vinyl arene)-modified elastomers of this invention produced when about 1 equivalent of halo methyl modifier reacts per lithium in the intermediate elastomer believed at least in part to be comprised of 1:1 adducts that can be schematically represented by the formula

Poly(diene-co-vinyl arene)—$CH_2ArCR=CH_2$ wherein R is as described above; co signifies the random, copolymer nature of the diene/vinyl arene portion of the polymer; with the degree of polymerization of the elastomer molecule sufficiently large to produce the molecular weights described hereinabove. Such elastomers can be referred to as methyl-vinyl arene-capped elastomers. Where less than one equivalent of halo methyl vinyl arene reacts with the lithium-terminated intermediate elastomer, either a mixture of capped and uncapped elastomers results or, under appropriate conditions, further complex series of reactions can occur including polymerization, jumping, coupling, lithium-halogen exchanges and the like. The resultant product of this series of concomitant and competing set of reactions, is probably a complex mixture of coupled and dimerized materials, at least a significant portion of which contribute to the observed hysteresis reduction in the recovered (halomethyl vinyl arene)-modified elastomers.

It is believed that the (halomethyl vinyl arene)-modified elastomers of the present invention interact significantly during vulcanization with filler present in the compounded elastomer rather than during mixing such as prior art polymers prepared with conventional end-capping agents. It is further believed that (halomethyl vinyl arene)-derived portion of the molecule can react with the polymer backbone of other polymers present in the vulcanizable compound during the vulcanization procedure, and thus effectively reduce the number of free end groups. As noted above, since free, unbound polymer end groups can cause high hysteresis properties, the present invention provides vulcanizates which exhibit reduced hysteresis properties.

The (halomethyl vinyl arene)-modified elastomers of the present invention can be used alone or in combination with other elastomers to prepare vulcanizable compounds to make components for manufactured articles such as tires. For example, they can be blended with any conventionally employed rubber stocks such as natural rubber, synthetic rubber and blends thereof. Such synthetic rubbers are well known to those skilled in the art and include synthetic cis-polyisoprene rubber, styrene/butadiene rubber (SBR), polybutadiene, butyl rubber, Neoprene, ethylene/propylene rubber (EPR), ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, propylene, tetrafluoroethylene/propylene rubber and the like. When the (halomethyl vinyl arene)-modified elastomers of the present invention are blended with conventional rubbers, the amounts can vary widely such as between 10 and 99 percent by weight, depending upon the amount of hysteresis reduction desired.

The inventive (halomethyl vinyl arene)-modified elastomers are usually compounded with reinforcing agents such as carbon black and vulcanizing agents to provide vulcanizable, compounded elastomers. Reinforcing agents are used in amounts ranging from about 20 to about 150 parts by weight, per 100 parts by weight of rubber (phr), with about 40 to about 70 phr being preferred. The preferred carbon black reinforcing agents include any of the commonly available, commercially-produced carbon blacks but those having a surface area (EMSA) of at least 20 $m^2$/gram and more, preferably at least 35 $m^2$/gram up to about 200 $m^2$/gram or higher, are specifically preferred. The surface area values referred to are those determined by ASTM-D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. See, for example, *The Vanderbilt Rubber Handbook*, pp 408–424, RT Vanderbilt Co., Norwalk, Conn. 06855 (1979). Other carbon blacks which may be utilized include thermal and acetylene blacks. Mixtures of two or more of the above blacks can be used in preparing the compounded elastomers of the invention. Typical values for surface areas of usable carbon blacks are summarized in the following Table I.

TABLE I

| Carbon Blacks | |
|---|---|
| ASTM Designation (D-1765-82a) | Surface Area ($m^2$/g) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the compounded elastomers of the invention may be in pelletized form or an unpelletized flocculent mass. Preferably, for more uniform mixing, unpelletized carbon black is preferred. The reinforcing rubber compounds can be cured in a conventional manner with known vulcanizing agents in the amounts of from about 0.5 to about 4 phr. For example, sulfur or peroxide-based vulcanized (curing) systems may be employed. Typically sulfur-containing vulcanizing systems are employed. For a general disclosure of suitable vulcanizing systems one can refer to Kirk-Othmer, *Encyclopedia of Chemical Technology*, 3rd ed., Wiley Interscience, New York 1982, Vol. 20, pp. 365–468, particularly "Vulcanization Agents and Auxiliary Materials" pp. 390–402. Vulcanizing agents may be used alone or in combination. Other reinforcing agents and fillers can also be used such as finely divided silica, clays, talc, and the like as can be other conventional rubber compounding ingredients such as anti-degradants, plasticizers, processing oils and aids, stabilizers and the like.

The compounded, vulcanizable elastomer compositions of the invention can be prepared by compounding or mixing the (halomethyl vinyl arene)-modified elastomers thereof with the aforedescribed carbon black and other conventional rubber additives and vulcanizing systems using standard rubber mixing equipment and procedures and in conventional amounts for such ingredients. Such compounded elastomer compositions, when vulcanized using conventional rubber vulcanization conditions, have reduced hysteresis properties and are particularly adapted for use as tread rubbers for tires having reduced rolling resistance. A typical formulation for the compounded elastomers of the present invention is described in Table II.

TABLE II

Compound Formulation

| | (phr)[a] |
|---|---|
| Inventive elastomer (rubber) | 100 |
| Carbon Black N339 | 50 |
| Zinc Oxide | 3 |
| Antioxidant | 1 |
| Sulfur | 1.8 |
| Stearic Acid | 2 |
| N-t-butyl-2-benzothiazyl sulfenamide | 1 |

[a]parts per hundred rubber

GENERAL EXPERIMENTAL

In order to demonstrate the preparation and properties of the (halomethyl vinyl arene)-modified elastomers of the present invention, a lithium-terminated styrene/-butadiene rubber (SBR) intermediate is prepared employing a suitable polymerization lithium initiator and an appropriate amount of halomethyl vinyl arene as will be more fully discussed hereinbelow. A control sample of the prepared polymer is isolated, and the remaining polymer is then modified by reaction with a halomethyl vinyl arene according to the invention. As noted above, various techniques known in the art for carrying out anionic lithium-initiated polymerization, elastomer intermediates, halomethyl vinyl arene and reactant proportions can be employed without departing from the scope of the present invention. In this description, as elsewhere in this application, all temperatures are in degrees centigrade and parts and percents are by weight unless expressly stared otherwise.

Both the control and the invention elastomer samples of each example are then tested, for example, for tensile strength (psi), percent elongation, tan delta (at both 24° and 65°) and the change in tan delta of the invention elastomer as compared to the control elastomer or a similar inventive elastomer is calculated. Tan delta values are determined on a Rheometrics stress rheometer at 0.5 Hz. Each compounded vulcanized elastomer can also be tested for rebound by employing the industry standard ball drop test.

EXAMPLE 1

To a 2-gallon reactor is added 2.02 lbs. of a 33% styrene solution in dry hexane, 7.00 lbs. of a 24.5% of a butadiene solution in dry hexane and 1.7 mmoles of a polar coordinator. After cooling to 13°, the butyl lithium is added. After 1.5 hours, the reaction temperature is carefully increased to 21.5°. The temperature is then increased at a rate of approximately 5°/0.25 hours until a final reaction temperature of 50° is reached. After 0.25 hours at this temperature, a sample of SBR elastomer intermediate is withdrawn, hydrolyzed and recovered to provide a Control 1 elastomer. The remaining polymerization mixture is then treated with a 0.9 molar solution of chloromethyl styrene in hexane and allowed to react at 50° for 0.25 hour. The (halomethyl vinyl arene)-modified elastomer is then isolated and drum dried to give inventive modified elastomer Example 1.

EXAMPLE 2

The procedure of Example 1 is followed except an amount of tributyl tin lithium corresponding to 10.9 millimoles is used in place of the butyl lithium initiator. The product are Control 2 and inventive modified elastomer Example 2.

The (halomethyl vinyl arene)-modified elastomers and control elastomers of Examples 1 and 2 are analyzed by conventional techniques to determine percent styrene and vinyl content, number average molecular weight (gpc) and hysteresis properties (tan delta). The results of these determinations are shown in Table III.

TABLE III

| | Control-1[b] | Example-1 | Control-2[b] | Example-2 |
|---|---|---|---|---|
| Initiator (mmoles) | BuLi (10.8) | | Bu$_3$SnLi (10.9) | |
| $\overline{Mn} \times 10^{-5}$ | 0.88 | 1.48 | 1.27 | 1.89 |
| Mw/Mn | 1.10 | 1.53 | 1.20 | 1.67 |
| % Sty. | 29.2 | | 28.2 | |
| % vinyl | 60.3 | | 55.7 | |
| Tensile, psi | 2874 | 2817 | 2740 | 3141 |
| % Elongation | 349 | 336 | 289 | 321 |
| Rebound % at 65° | 49.8 | 59.8 | 64.4 | 64.8 |
| Tan delta:[c] | | | | |
| at 24° | .2587 | .1707 | .1448 | .1354 |
| at 65° | .1867 | .1146 | .0833 | .0788 |
| % change in Tan delta: | | | | |
| at 24° | | −34.0 | | −6.5 |
| at 65° | | −38.6 | | −5.4 |
| ClCH$_2$C$_6$H$_4$CH=CH$_2$, mmoles | | 6.5 | | 5.27 |

[b]Elastomer Intermediate withdrawn before holomethyl arene-modification, hydrolyzed and recovered.
[c]Elastomers compounded with 50 phr N 339 carbon black and vulcanized with sulfur at 150° for 40 minutes The tan delta values at both 24° and 65° of Examples 1-2 are reduced compared to the unmodified control elastomers (withdrawn before introduction of chloromethyl-styrene modifier), clearly demonstrating the effects of the modification. The rebound value for Example 1 is increased showing a reduction in hysteresis compared to Control 1.

It is clear from the foregoing examples and specification disclosure that the (halomethyl vinyl arene)-modified elastomers of the present invention are useful for providing vulcanized elastomer compounds with improved, that is reduced, hysteresis characteristics. These elastomers exhibit improved hysteresis properties when compared to similar elastomers prepared by similar means but lacking the (halomethyl vinyl arene)-modification groups. As a result, the vulcanized compounds containing these elastomers exhibit improved hysteresis properties which provide road-contacting components of improved rolling resistance for tires.

Techniques for preparing tread components for use in pneumatic tires of conventional construction (with grooved road contacting tread components, sidewalls, spaced beads and metal or fiber-reinforced carcasses) are known in the art. These include extrusion of the road-contacting tread components from rubber stocks including the compounded elastomers of the present invention (or in combinations with other types of rubbers as noted above), assembly of the tread components with other elements of tire to provide a green tire and vulcanization of the green tire in a conventional tire mold. Tires made with road-contacting treads comprised of the vulcanized, compounded modified-elastomers according to this invention exhibit desirable properties such as reduced rolling resistance. The compounded (halomethyl vinyl arene)-modified elastomers of this invention can also be used in other tire components such as plycoats for the fabric reinforcement of the tire carcass, in the sidewalls or in the thread rubber base (located under the road-contacting tread portion or tread cap) as well as in other industrial rubber goods such as air springs, seismic anti-vibrational isolators, engine mounts and the like where the low hysteresis properties they manifest upon vulcanization will provide properties of advantage.

It is to be understood that the invention is not limited to the specific initiators, elastomer intermediates, halomethyl arenes, monomers, polar coordinators, reactant ratios, solvents or techniques disclosed herein, except as otherwise stated in the specification. Similarly, the examples have been provided merely to demonstrate practice of the subject invention and not constitute limitations of the invention. Those skilled in the art may readily select other monomers and process conditions, according to the disclosure made hereinabove that are within the invention.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A (halomethyl arene)-modified elastomer having reduced hysteresis properties and made by reacting a lithium terminated elastomer intermediate with the halogen atom of a halomethyl vinyl arene compound of the formula XCH$_2$Ar CR=CH$_2$ wherein R is a hydrogen, a lower alkyl group of one to about eight carbons or an aryl group of six to about ten carbons, Ar is a divalent aryl nucleus of six to 12 carbons and X is a chlorine, bromine or iodine atom.

2. The elastomer of claim 1 wherein the elastomer intermediate is a diene polymer made by polymerizing a diene monomer of four to about eight carbons with a lithium initiator selected from the group consisting of alkyl lithiums of one to about eight carbons, aryl lithiums of six to about twelve carbons, tri(alkyl) tin lithiums wherein each alkyl is of one to about eight carbons and combinations of two or more of these.

3. The elastomer of claim 2 wherein the elastomer intermediate is a diene-vinyl arene polymer made by copolymerizing the diene monomer with a vinyl arene monomer of eight to about twelve carbons, Ar is a divalent phenyl or tolyl nucleus and X is chlorine.

4. The elastomer of claim 3 wherein the elastomer intermediate is a lithium-terminated random styrene-butadiene rubber.

5. The elastomer of claim 4 wherein R is a hydrogen and the molar ratio of halomethyl arene compound to lithium atoms in the lithium-terminated intermediate is about 0.8–1.5.

6. The elastomer of claim 5 wherein the halomethyl arene compound is selected from the group consisting of chloromethyl styrene, chloromethyl methyl (styrene), chloromethyl dimethylstyrene, chloromethyl chlorostyrene and chloromethyl vinyl naphthalene.

7. The elastomer of claim 5 wherein the lithium-terminated intermediate elastomer is of the formula Poly(butadiene-co-styrene)Li and the halomethyl arene compound is of the formula Cl—CH$_2$—C$_6$H$_4$—CH=CH$_2$.

8. The elastomer of claim 7 wherein the (halomethyl arene)-modified elastomer is of the formula Poly(butadiene-co-styrene)CH$_2$—Ph—CH=CH$_2$ wherein Ph is a —C$_6$H$_4$— or C$_6$H$_3$(CH$_3$)—nucleus.

9. A compounded, vulcanizable elastomer composition comprising (a) the (halomethyl arene)-modified elastomer of claim 1, a finely divided reinforcing agent and (c) a vulcanizing system.

10. A compounded, vulcanizable elastomer composition comprising (a) the (halomethyl arene)-modified elastomer of claim 4, (b) a carbon black reinforcing agent and (c) a sulfur-based vulcanizing system.

11. A compounded, vulcanizable elastomer composition comprising (a) 100 parts by weight of the (halomethyl arene)-modified elastomer of claim 8, (b) about 20–150 parts by weight of carbon black reinforcing agent and (c) an effective amount of a sulfur-based vulcanizing system.

12. A vulcanized elastomer compound of low hysteresis properties made by vulcanizing the composition of claim 9.

13. A vulcanized elastomer compound of low hysteresis properties made by vulcanizing the composition of claim 10.

14. A vulcanized elastomer compound of low hysteresis properties made by vulcanizing the composition of claim 11.

15. A road-contacting tread component for a pneumatic tire fabricated from vulcanized elastomer having reduced hysteresis properties and made by vulcanizing an elastomer composition comprising (a) a (halomethyl arene)-modified elastomer of the formula Poly(diene-co-styrene)CH$_2$ Ph CH=CH$_2$ wherein the diene is an alkadiene of four to about six carbons, Ph is a —C$_6$H$_4$— or C$_6$H$_3$(CH$_3$)—nucleus and the modified elastomer has a number average molecular weight of about 10,000–1,000,000; (b) a carbon black reinforcing agent; and (c) a sulfur-based vulcanizing system.

16. A tread component of claim 15 wherein the diene is butadiene, Ph is —C$_6$H$_4$— and the number average molecular weight of the modified elastomer is about 50,000 to about 600,000.

17. The tread component of claim 16 wherein the amount of carbon black reinforcing agent is 20–150 parts by weight per 100 parts by weight of the (halomethyl arene)-modified elastomer.

18. A tire of low rolling resistance comprising the road-contacting tread component of claim 15.

* * * * *